US012700552B2

(12) United States Patent
Lehtimäki et al.

(10) Patent No.: US 12,700,552 B2
(45) Date of Patent: Aug. 4, 2026

(54) ELECTRIC SWITCH

(71) Applicant: ABB Schweiz AG, Baden (CH)

(72) Inventors: Jarmo Lehtimäki, Vaasa (FI); Antti Kultalahti, Vaasa (FI)

(73) Assignee: ABB SCHWEIZ AG, Baden (CH)

( * ) Notice: Subject to any disclaimer, the term of this patent is extended or adjusted under 35 U.S.C. 154(b) by 279 days.

(21) Appl. No.: 18/511,222

(22) Filed: Nov. 16, 2023

(65) Prior Publication Data

US 2024/0177947 A1 May 30, 2024

(30) Foreign Application Priority Data

Nov. 28, 2022 (EP) .................................... 22209865

(51) Int. Cl.
*H01H 9/32* (2006.01)

(52) U.S. Cl.
CPC .................................... *H01H 9/32* (2013.01)

(58) Field of Classification Search
CPC ........ H01H 1/2041; H01H 9/32; H01H 33/06; H01H 33/02; H01H 33/008; H01H 33/04
USPC .................................. 218/41, 31; 200/50.22
See application file for complete search history.

(56) References Cited

U.S. PATENT DOCUMENTS 2,864,914 A * 12/1958 Coburn .................... H01H 1/18 337/67
4,647,741 A 3/1987 Belbel et al.
4,801,772 A * 1/1989 Bratkowski ............ H01H 77/10 218/117
4,849,591 A * 7/1989 Comtois .................. H01H 9/32 218/117
6,084,193 A * 7/2000 Pellon ...................... H01H 9/32 218/117
8,686,311 B2 * 4/2014 Vigouroux ............... H01H 9/32 218/147
10,770,248 B2 * 9/2020 Oh ....................... H01H 1/2058
(Continued)

FOREIGN PATENT DOCUMENTS

CN 102376505 A 3/2012
EP 640998 A1 3/1995
(Continued)

OTHER PUBLICATIONS

European Search Report; Application No. EP 22209865; Completed May 10, 2023; 3 Pages.
(Continued)

*Primary Examiner* — William A Bolton
(74) *Attorney, Agent, or Firm* — Greenberg Traurig, LLP

(57) ABSTRACT

An electric switch including a frame, a first stationary contact stationarily fixed to the frame, a contact support element adapted to move relative to the frame between a first position and second position, a movable contact stationarily fixed relative to the contact support element and having a longitudinal direction, a first arc shutter, and an actuation system for moving and guiding the first arc shutter during an opening event. The actuation system includes a first actuator member stationarily fixed relative to the frame, and a second actuator member stationarily fixed relative to the first arc shutter. The first arc shutter is adapted to move in an outward direction during the opening event, wherein the outward direction is parallel to the longitudinal direction of the movable contact.

20 Claims, 3 Drawing Sheets

(56) References Cited

U.S. PATENT DOCUMENTS

| | | | | |
|---|---|---|---|---|
| 11,145,472 | B2 * | 10/2021 | Zhang | H01H 73/18 |
| 11,361,914 | B2 * | 6/2022 | Zhang | H01H 9/32 |
| 2014/0048513 | A1 * | 2/2014 | Sato | H01H 73/18<br>218/117 |

FOREIGN PATENT DOCUMENTS

| | | | | |
|---|---|---|---|---|
| EP | 3561831 | A1 | 10/2019 | |
| FR | 2982995 | A1 * | 5/2013 | H01H 1/20 |
| WO | 121986 | A1 | 6/2019 | |

OTHER PUBLICATIONS

European Office Action; Application No. 22 209 865.9; Completed: Aug. 5, 2025; 5 Pages.

* cited by examiner

Fig. 4
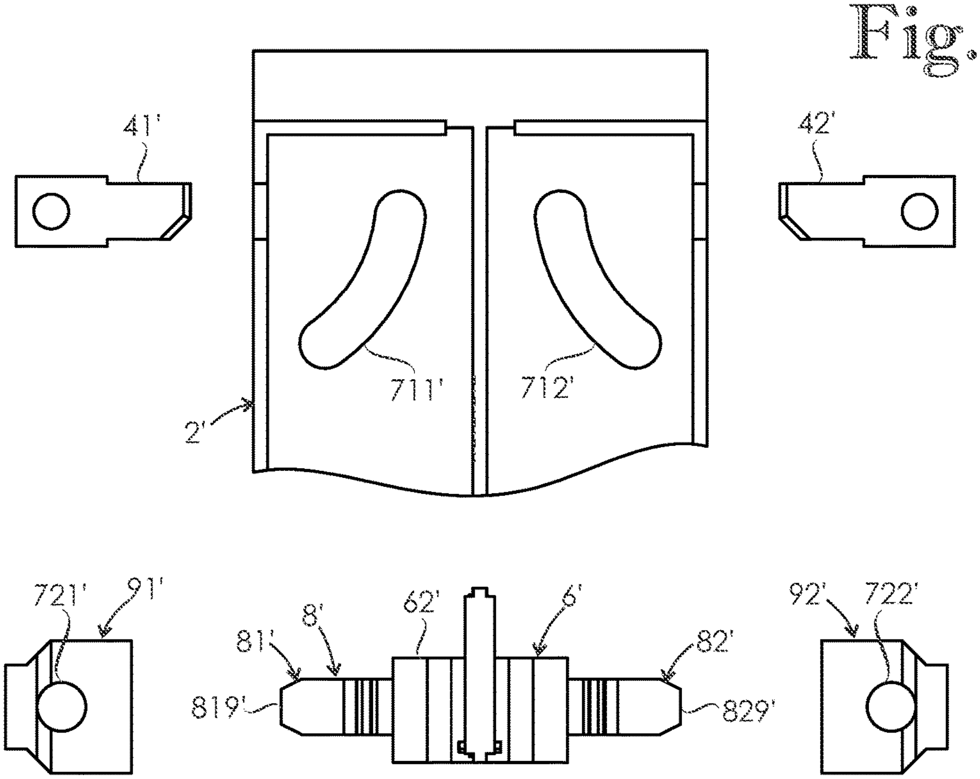
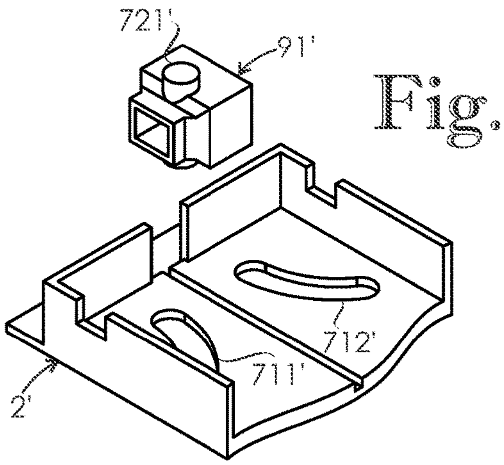
Fig. 5
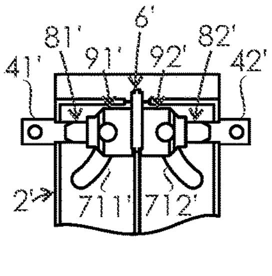
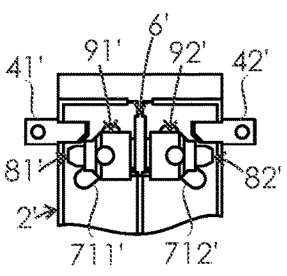
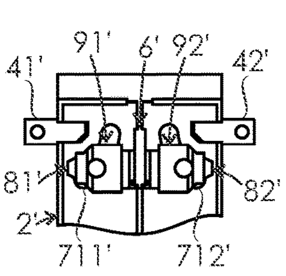
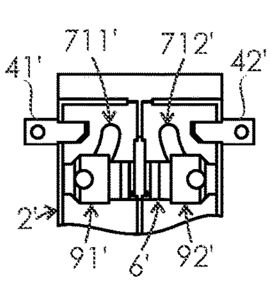
Fig. 6A Fig. 6B Fig. 6C Fig. 6D

ELECTRIC SWITCH

FIELD OF THE INVENTION

The present invention relates to an electric switch.

BACKGROUND OF THE INVENTION

Publication EP3561831A1 discloses a known electric switch comprising at least one shutter element which is movable in synchronism with a movable contact between an extended position in which the shutter element is positioned between a fixed contact and the movable contact when the movable contact is in the open position, and a contracted position in which the shutter element is positioned outside the patch of the movable contact allowing the movable contact to turn from the open position to the closed position. The movable contact is supported on a rotatable roller and the roller is rotatably supported in the side panels of the housing, wherein an inner end of the shutter element is supported with an articulated joint on the roller, and an outer end of the shutter element is positioned in guide grooves formed in the side panels of the housing.

The invention discussed in the above-mentioned publication is primarily intended for electric switches having high rated currents. Such electric switches are inherently relatively large, and space utilization inside frames thereof is not a very critical issue. However, in electric switches having lower rated currents, there is less space inside the frame, and therefore in some installations, structures required for supporting and guiding the at least one shutter element of the known electric switch are regarded as disadvantages.

SUMMARY

An object of the present invention is to provide an electric switch so as to alleviate the above disadvantages. The objects of the invention are achieved by an electric switch described below.

The invention is based on the idea of providing an electric switch with a first arc shutter which is located around the movable contact, and is adapted to move in an outward direction during an opening event, wherein the outward direction is parallel to a longitudinal direction of the movable contact.

An advantage of the electric switch according to the present invention is that the first arc shutter and an actuation system for moving and guiding the first arc shutter require only little space inside the frame of the electric switch. For example, the present invention enables omitting the articulated joint on the roller of the known electric switch thereby saving space.

A further advantage of the electric switch according to the present invention is that assembling of the electric switch is easy.

A still further advantage of the electric switch according to the present invention is that due to an improved capability to extinguish electric arcs provided by the first arc shutter, extinguishing plates can be omitted in many embodiments.

BRIEF DESCRIPTION OF THE DRAWINGS

In the following the invention will be described in greater detail by means of preferred embodiments with reference to the attached drawings, in which

FIG. 4 shows main components of an electric switch according to another embodiment of the present invention;

FIG. 5 shows a frame and a first arc shutter of the electric switch shown in FIG. 4 from a different angle; and FIGS. 6A to 6D illustrate movement of the first and second arc shutters of the electric switch shown in FIG. 4 during movement of a contact support element between a first position and second position thereof.

DETAILED DESCRIPTION OF THE INVENTION

Figure 1:
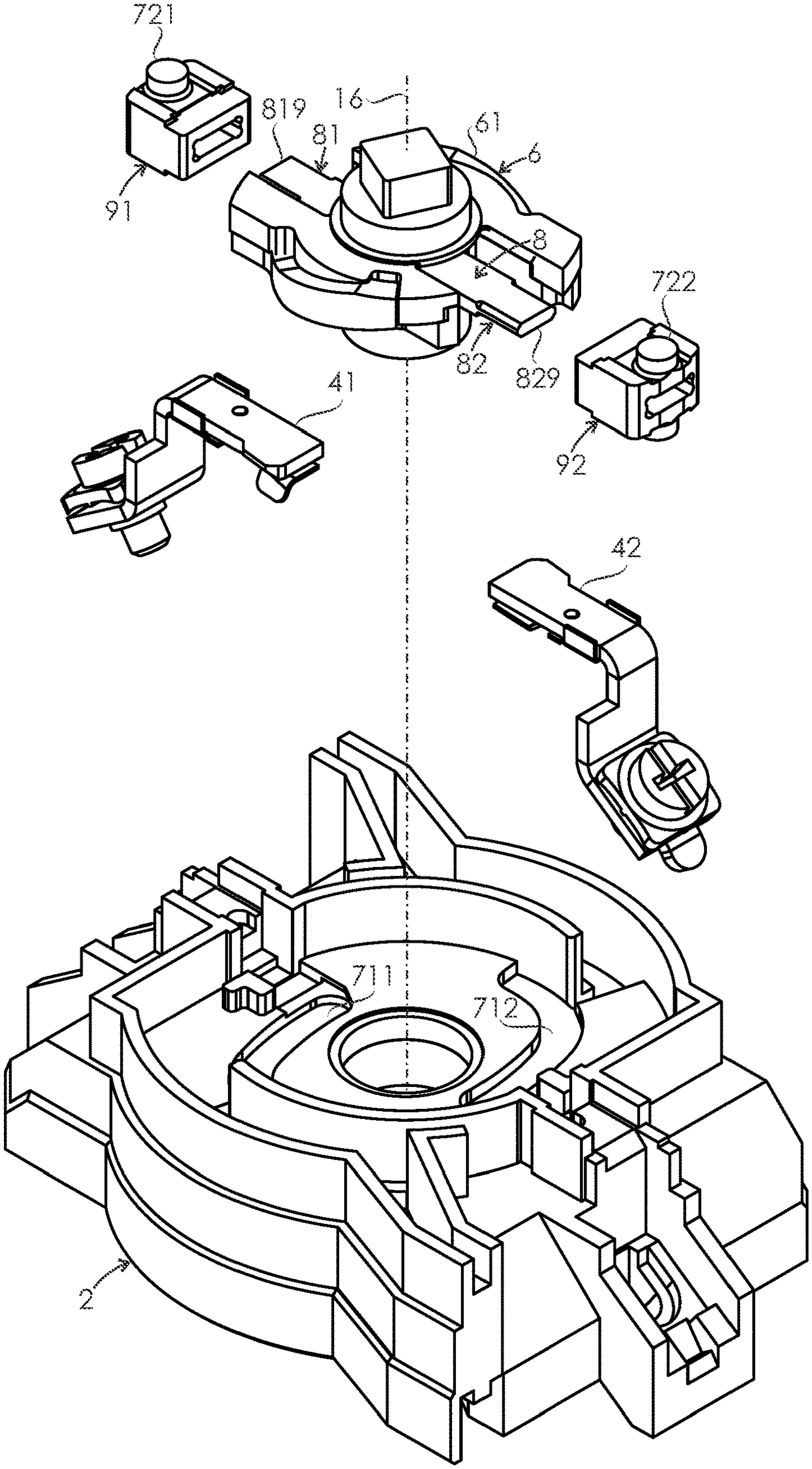
FIG. 1 shows an exploded view of an electric switch according to an embodiment of the present invention.
Figure 2:
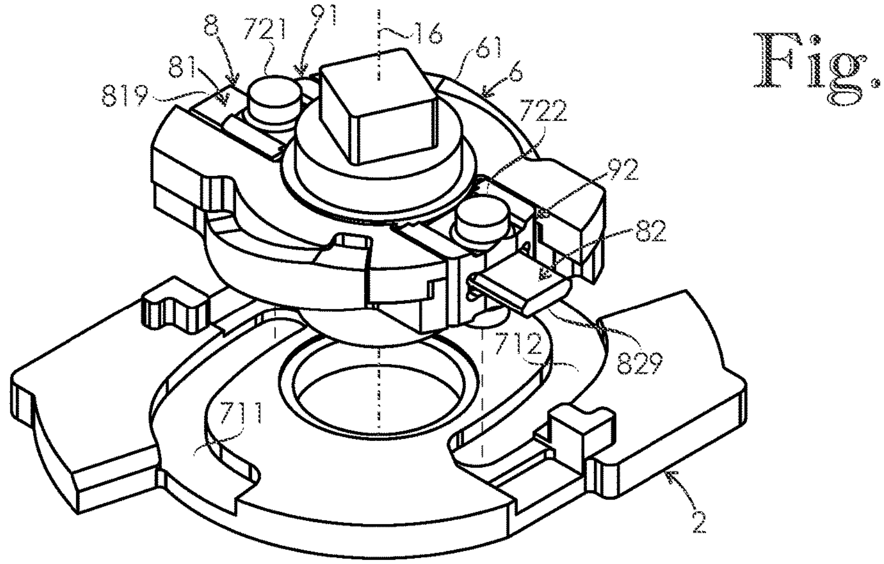
FIG. 2 shows a detail of the electric switch shown in FIG. 1, in which first and second arc shutters are located around first and second contact portions of the movable contact, respectively, and a frame of the electric switch is shown only partially.

FIG. 1 shows an exploded view of an electric switch comprising a frame 2, a first stationary contact 41, a second stationary contact 42, a contact support element 6, a movable contact 8, a first arc shutter 91, a second arc shutter 92 and an actuation system. In FIG. 1, a cover element adapted to enclose the movable contact 8, the first arc shutter 91, and the second arc shutter 92 within the frame 2 is omitted.

The first stationary contact 41 and the second stationary contact 42 are stationarily fixed to the frame 2. The contact support element 6 is adapted to move relative to the frame 2 between a first position and second position. The contact support element 6 comprises a roll element 61 adapted to rotate relative to the frame 2 around a rotation axis 16 between the first position and second position.

The movable contact 8 is stationarily fixed relative to the contact support element 6, has a longitudinal direction, and comprises a first contact portion 81 and second contact portion 82 such that in the first position of the contact support element 6 the first contact portion 81 is electrically conductively connected to the first stationary contact 41 and the second contact portion 82 is electrically conductively connected to the second stationary contact 42, and in the second position of the contact support element 6 the movable contact 8 is disconnected from the first stationary contact 41 and the second stationary contact 42. The first contact portion 81 and second contact portion 82 of the movable contact 8 are located on opposite sides of the rotation axis 16 of the contact support element 6 in a direction parallel to the longitudinal direction of the movable contact 8.

The first position of the contact support element 6 provides a connected state or on-state of the electric switch, in which the first stationary contact 41 and the second stationary contact 42 are electrically conductively connected to each other. The second position of the contact support element 6 provides a disconnected state or off-state of the electric switch, in which there is no electrically conductive connection between the first stationary contact 41 and the second stationary contact 42.

The first arc shutter 91 is adapted to enhance extinguishing of electric arcs between the first stationary contact 41 and the first contact portion 81 of the movable contact 8 during an opening event between the first stationary contact 41 and the first contact portion 81 of the movable contact 8. The second arc shutter 92 is adapted to enhance extinguishing of electric arcs between the second stationary contact 42 and the second contact portion 82 of the movable contact 8 during an opening event between the second stationary contact 42 and the second contact portion 82 of the movable contact 8. Herein, an opening event refers to an event in which an electrically conductive connection between two contact members is removed.

Both the first arc shutter 91 and the second arc shutter 92 are made of electrically insulating material, and are movable relative to both the frame 2 and the contact support element 6. In an embodiment, the first arc shutter and the second arc shutter are made of POM, PA66, PC, PMMA, PP or PTFE material, or a combination thereof.

The actuation system is adapted for moving and guiding the first arc shutter 91 and the second arc shutter 92 during the respective opening events. The actuation system comprises first actuator members 711 and 712 stationarily fixed relative to the frame 2, and second actuator members 721 and 722 stationarily fixed relative to the first arc shutter 91 and second arc shutter 92, respectively. The first actuator members 711 and 712 and the second actuator members 721 and 722 are adapted to co-operate with each other during the opening events for guiding the first arc shutter 91 and the second arc shutter 92.

The first arc shutter 91 is adapted to move in an outward direction during the opening event, wherein the outward direction is parallel to the longitudinal direction of the movable contact 8, and is directed towards a free end 819 of the first contact portion 81. The second arc shutter 92 is adapted to move in an outward direction during the opening event, wherein the outward direction is parallel to the longitudinal direction of the movable contact 8, and is directed towards a free end 829 of the second contact portion 82. The free end 819 of the first contact portion 81 and the free end 829 of the second contact portion 82 are spaced apart in the longitudinal direction of the movable contact 8.

The first arc shutter 91 and the second arc shutter 92 are adapted to move rectilinearly relative to the contact support element 6 during the respective opening events. The first arc shutter 91 surrounds a section of the first contact portion 81 such that on a plane perpendicular to the longitudinal direction of the movable contact 8, a projection of the first contact portion 81 is inside a projection of the first arc shutter 91. The second arc shutter 92 surrounds a section of the second contact portion 82 such that on a plane perpendicular to the longitudinal direction of the movable contact 8, a projection of the second contact portion 82 is inside a projection of the second arc shutter 92. Herein, "to surround" means "to enclose on all sides".

Each of the first actuator members 711 and 712 comprises a guide groove integrally formed to the frame 2. There are two additional guide grooves in the cover element not shown in FIG. 1. Each of the second actuator members 721 and 722 comprises a pin. Both the first arc shutter 91 and the second arc shutter 92 comprises two pins, located on opposite sides of the corresponding arc shutter. One of the two pins is adapted to co-operate with a guide groove formed in the frame, and the other is adapted to co-operate with a guide groove formed in the cover element.

First ends of the guide grooves are limiters adapted to stop movement of the contact support element 6 when the contact support element 6 reaches the second position thereof. The first end of the guide groove stops corresponding arc shutter, and the arc shutter stops the contact support element 6. This reduces strain on a mechanism adapted to control the contact support element 6.

Figure 3A:
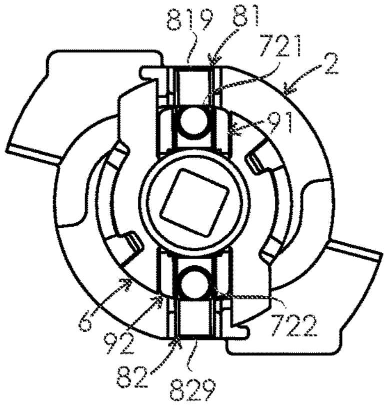
FIGS. 3A to 3C illustrate movement of the first and second arc shutters of the electric switch shown in FIG. 1 during movement of a contact support element between a first position and second position thereof.
Figure 3B:
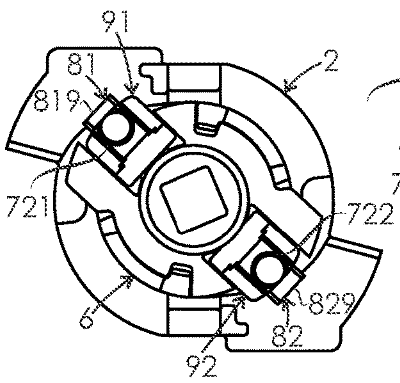
Figure 3C:
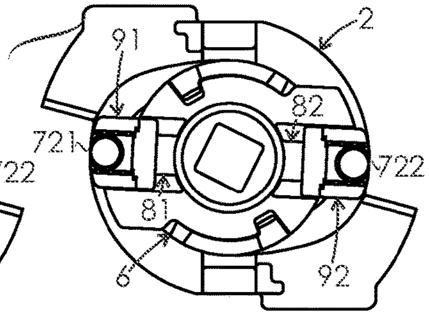

FIGS. 3A to 3C illustrate movement of the first arc shutter 91 and second arc shutter 92 during movement of the contact support element 6 between the first position and second position thereof. FIG. 3A illustrates the on-state of the electric switch, FIG. 3B illustrates an intermediate state between the on-state and the off-state of the electric switch, and FIG. 3C illustrates the off-state of the electric switch.

In FIG. 3A, the contact support element 6 is in the first position thereof. The first arc shutter 91 is in a retracted position thereof at a distance from the free end 819 of the first contact portion 81, and the second arc shutter 92 is in a retracted position thereof at a distance from the free end 829 of the second contact portion 82.

In FIG. 3B, the contact support element 6 is in an intermediate position between the first position and the second position thereof. Compared to FIG. 3A, the contact support element 6 has been rotated 30° anticlockwise. The first arc shutter 91 has moved in an outward direction towards the free end 819 of the first contact portion 81. The second arc shutter 92 has moved in an outward direction towards the free end 829 of the second contact portion 82.

In FIG. 3C, the contact support element 6 is in the second position thereof. Compared to FIG. 3A, the contact support element 6 has been rotated 90° anticlockwise. The first arc shutter 91 is in an outer position in which an outermost portion of the first arc shutter 91 is located further in the longitudinal direction than the free end 819 of the first contact portion 81. The second arc shutter 92 is in an outer position in which an outermost portion of the second arc shutter 92 is located further in the longitudinal direction than the free end 829 of the second contact portion 82. In an alternative embodiment, the first arc shutter is adapted to move in the outward direction to an outer position in which an outermost portion of the first arc shutter is located as far in the longitudinal direction as the free end of the first contact portion.

In FIG. 3A, the longitudinal direction of movable contact 8 is a vertical direction, and in FIG. 3C, the longitudinal direction of movable contact 8 is a horizontal direction.

FIG. 4 shows main components of an electric switch according to another embodiment of the present invention. The electric switch comprises a frame 2', a first stationary contact 41', a second stationary contact 42', a contact support element 6', a movable contact 8', a first arc shutter 91', a second arc shutter 92' and an actuation system. The movable contact 8' is stationarily fixed relative to the contact support element 6', has a longitudinal direction, and comprises a first contact portion 81' and second contact portion 82'.

The contact support element 6' comprises a slide element 62' adapted to move rectilinearly relative to the frame 2' between the first position and second position. The slide element 62' is adapted to move perpendicularly to the longitudinal direction of the movable contact 8'. In FIG. 4, the slide element 62' is adapted to move rectilinearly in vertical direction relative to the frame 2' between the first position and second position.

FIG. 5 shows the frame 2' and the first arc shutter 91' of the electric switch shown in FIG. 4 from a different angle. FIG. 5 shows that the first arc shutter 91' is adapted to surround a section of the first contact portion 81' such that on a plane perpendicular to the longitudinal direction of the movable contact 8', a projection of the first contact portion 81' is inside a projection of the first arc shutter 91'.

The second arc shutter 92' is adapted to surround a section of the second contact portion 82' such that on a plane perpendicular to the longitudinal direction of the movable contact 8', a projection of the second contact portion 82' is inside a projection of the second arc shutter 92'.

FIGS. 6A to 6D illustrate movement of the first arc shutter 91' and second arc shutter 92' of the electric switch shown in FIG. 4 during movement of the contact support element 6' between a first position and second position thereof. FIG. 6A illustrates the on-state of the electric switch, FIG. 6B illustrates a first intermediate state between the on-state and the off-state of the electric switch, FIG. 6C illustrates a second intermediate state between the on-state and the off-state of the electric switch, and FIG. 6D illustrates the off-state of the electric switch.

In FIG. 6A, the contact support element 6' is in the first position thereof. The first arc shutter 91' is in a retracted position thereof at a distance from a free end of the first contact portion 81', and the second arc shutter 92' is in a retracted position thereof at a distance from a free end of the second contact portion 82'.

In FIG. 6B, the contact support element' 6 is in a first intermediate position between the first position and the second position thereof. Compared to FIG. 6A, the contact support element 6' has been moved downwards relative to the frame 2'. The first arc shutter 91' has moved in an outward direction towards the free end of the first contact portion 81'. The second arc shutter 92' has moved in an outward direction towards the free end of the second contact portion 82'.

In FIG. 6C, the contact support element' 6 is in a second intermediate position between the first position and the second position thereof. Compared to FIG. 6B, the contact support element 6' has been moved further downwards relative to the frame 2'. The first arc shutter 91' has almost reached the free end of the first contact portion 81'. The second arc shutter 92' has almost reached the free end of the second contact portion 82'.

In FIG. 6D, the contact support element 6' is the second position thereof. The first arc shutter 91' is in an outer position in which an outermost portion of the first arc shutter 91' is located further in the longitudinal direction than the free end of the first contact portion 81'. The second arc shutter 92' is in an outer position in which an outermost portion of the second arc shutter 92' is located further in the longitudinal direction than the free end of the second contact portion 82'.

In FIGS. 6A to 6D, the longitudinal direction of the movable contact 8' is a horizontal direction.

Electric switches shown in FIGS. 1 and 4 each have a movable contact provided with two free ends such that during the opening event of the electric switch there are two potential locations for electric arcs, namely between the first stationary contact and the first contact portion of the movable contact, and between the second stationary contact and the second contact portion of the movable contact. An electric switch according to an alternative embodiment comprises a braided conductor between the second stationary contact and the second contact portion of the movable contact, wherein an electric arc can be formed only between the first stationary contact and the first contact portion of the movable contact. In this embodiment, only the first arc shutter is required.

Movable contacts of electric switches shown in FIGS. 1 and 4 are blade contacts. In an alternative embodiment, the movable contact is a bumper contact.

Electric switches shown in FIGS. 1 and 4 do not comprise extinguishing plates. Extinguishing plates are not required due to high capability to extinguish electric arcs provided by the first arc shutter and the second arc shutter.

In order to move the first arc shutter in the outward direction during the opening event, the movable contact and/or the contact support element is adapted to co-operate with the first arc shutter. In other words, the movable contact and/or the contact support element is adapted to be in contact with the first arc shutter for exerting forces to the first arc shutter during the opening event. Therefore, propelling forces for moving the first arc shutter originate from the movable contact and/or the contact support element. Forces exerted to the first arc shutter by the actuation system are reaction forces.

The actuation system is also adapted for moving and guiding the first arc shutter during a closing event. Herein, a closing event refers to an event in which an electrically conductive connection is formed between two contact members. The closing event is a reverse event compared to the opening event. Therefore, in order to move the first arc shutter in an inward direction during the closing event, the movable contact and/or the contact support element is adapted to co-operate with the first arc shutter. The inward direction is an opposite direction compared to the outward direction.

In an embodiment, the first arc shutter is provided with a magnet adapted to further disrupt the electric arc during the opening event.

In an embodiment, a rated current of the electric switch is less than or equal to 50 A.

It will be obvious to a person skilled in the art that the inventive concept can be implemented in various ways. The invention and its embodiments are not limited to the examples described above but may vary within the scope of the claims.

The invention claimed is:

1. An electric switch comprising:

a frame;

a first stationary contact stationarily fixed to the frame;

a contact support element adapted to move relative to the frame between a first position and second position;

a movable contact stationarily fixed relative to the contact support element, having a longitudinal direction, and having a first contact portion such that in the first position of the contact support element the first contact portion is electrically conductively connected to the first stationary contact, and in the second position of the contact support element the movable contact is disconnected from the first stationary contact;

a first arc shutter adapted to enhance extinguishing of electric arcs between the first stationary contact and the first contact portion of the movable contact during an opening event between the first stationary contact and the first contact portion of the movable contact, wherein the first arc shutter is made of electrically insulating material, and movable relative to both the frame and the contact support element; and an actuation system for moving and guiding the first arc shutter during the opening event, the actuation system including at least one first actuator member stationarily fixed relative to the frame, and at least one second actuator member stationarily fixed relative to the first arc shutter, wherein the at least one first actuator member and the at least one second actuator member are adapted to co-operate with each other during the opening event for guiding the first arc shutter, wherein the first arc shutter is adapted to move in an outward direction during the opening event, wherein the outward direction is parallel to the longitudinal direction of the movable contact, and is directed towards a free end of the first contact portion, wherein the first arc shutter surrounds a section of the first contact portion such that on a plane perpendicular to the longitudinal direction of the movable contact, a projection of the first contact portion is inside a projection of the first arc shutter, and wherein the at least one first actuator member includes a guide groove, and the at least one second actuator member includes a pin.

2. The electric switch according to claim 1, wherein the first arc shutter is adapted to move rectilinearly relative to the contact support element during the opening event.

3. The electric switch according to claim 1, wherein in order to move the first arc shutter in the outward direction during the opening event, the movable contact and/or the contact support element is adapted to co-operate with the first arc shutter.

4. The electric switch according to claim 1, wherein a first end of the guide groove is adapted to operate as a limiter during the opening event such that the first end of the guide groove is adapted to stop movement of the first arc shutter at the end of the opening event.

5. The electric switch according to claim 4, wherein during the opening event, the first arc shutter is adapted to stop movement of the contact support element when the contact support element reaches the second position thereof.

6. The electric switch according to claim 1, wherein a second end of the guide groove is adapted to operate as a limiter during a closing event between the first stationary contact and the first contact portion of the movable contact such that the second end of the guide groove is adapted to stop movement of the first arc shutter at the end of the closing event.

7. The electric switch according to claim 6, wherein during the closing event, the first arc shutter is adapted to stop movement of the contact support element when the contact support element reaches the first position thereof.

8. The electric switch according to claim 1, wherein during the opening event, the first arc shutter is adapted to move in the outward direction to an outer position in which an outermost portion of the first arc shutter is located at least as far in the longitudinal direction as the free end of the first contact portion.

9. The electric switch according to claim 1, wherein the contact support element comprises a roll element adapted to rotate relative to the frame around a rotation axis between the first position and second position.

10. The electric switch according to claim 1, wherein the contact support element comprises a slide element adapted to move rectilinearly relative to the frame between the first position and second position.

11. The electric switch according to claim 1, wherein a rated current of the electric switch is less than or equal to 50 A.

12. The electric switch according to claim 1, wherein the electric switch comprises:

a second stationary contact stationarily fixed to the frame; and a second arc shutter, wherein the movable contact includes a second contact portion such that in the first position of the contact support element the second contact portion is electrically conductively connected to the second stationary contact, and in the second position of the contact support element the movable contact is disconnected from the second stationary contact, wherein the second arc shutter is adapted to enhance extinguishing of electric arcs between the second stationary contact and the second contact portion of the movable contact during an opening event between the second stationary contact and the second contact portion of the movable contact, wherein the second arc shutter is made of electrically insulating material, and movable relative to both the frame and the contact support element, wherein the actuation system is adapted for moving and guiding the second arc shutter during the opening event, wherein the at least one first actuator member and the at least one second actuator member are adapted to co-operate with each other during the opening event for guiding the second arc shutter, and wherein the second arc shutter is adapted to move in an outward direction during the opening event, wherein the outward direction is parallel to the longitudinal direction of the movable contact and is directed towards a free end of the second contact portion.

13. An electric switch comprising:

a frame;

a first stationary contact stationarily fixed to the frame;

a contact support element adapted to move relative to the frame between a first position and second position;

a movable contact stationarily fixed relative to the contact support element, having a longitudinal direction, and having a first contact portion such that in the first position of the contact support element the first contact portion is electrically conductively connected to the first stationary contact, and in the second position of the contact support element the movable contact is disconnected from the first stationary contact;

a first arc shutter adapted to enhance extinguishing of electric arcs between the first stationary contact and the first contact portion of the movable contact during an opening event between the first stationary contact and the first contact portion of the movable contact, wherein the first arc shutter is made of electrically insulating material, and movable relative to both the frame and the contact support element; and an actuation system for moving and guiding the first arc shutter during the opening event, the actuation system including at least one first actuator member stationarily fixed relative to the frame, and at least one second actuator member stationarily fixed relative to the first arc shutter, wherein the at least one first actuator member and the at least one second actuator member are adapted to co-operate with each other during the opening event for moving and guiding the first arc shutter, wherein the first arc shutter is adapted to move in an outward direction during the opening event, wherein the outward direction is parallel to the longitudinal direction of the movable contact, and is directed towards a free end of the first contact portion, and wherein the first arc shutter surrounds a section of the first contact portion such that on a plane perpendicular to the longitudinal direction of the movable contact, a projection of the first contact portion is inside a projection of the first arc shutter, wherein the at least one first actuator member includes a guide groove, and the at least one second actuator member includes a pin, and wherein the guide groove and the pin are adapted to co-operate with each other during the opening event for moving and guiding the first arc shutter.

14. The electric switch according to claim 13, wherein the first arc shutter is adapted to move rectilinearly relative to the contact support element during the opening event.

15. The electric switch according to claim 13, wherein in order to move the first arc shutter in the outward direction during the opening event, the movable contact and/or the contact support element is adapted to co-operate with the first arc shutter.

16. The electric switch according to claim 13, wherein a first end of the guide groove is adapted to operate as a limiter during the opening event such that the first end of the guide groove is adapted to stop movement of the first arc shutter at the end of the opening event.

17. The electric switch according to claim 13, wherein during the opening event, the first arc shutter is adapted to move in the outward direction to an outer position in which an outermost portion of the first arc shutter is located at least as far in the longitudinal direction as the free end of the first contact portion.

18. The electric switch according to claim 13, wherein the contact support element comprises a roll element adapted to rotate relative to the frame around a rotation axis between the first position and second position.

19. The electric switch according to claim 13, wherein the contact support element comprises a slide element adapted to move rectilinearly relative to the frame between the first position and second position.

20. The electric switch according to claim 13, wherein a rated current of the electric switch is less than or equal to 50 A.

* * * * *